(12) United States Patent
Chen et al.

(10) Patent No.: US 7,876,506 B2
(45) Date of Patent: Jan. 25, 2011

(54) ELECTRO-WETTING DISPLAY DEVICE

(75) Inventors: Sung-Yen Chen, Miao-Li (TW);
Shuo-Ting Yan, Miao-Li (TW)

(73) Assignee: Chimel Innolux Corporation, Miao-Li County (TW)

( * ) Notice: Subject to any disclaimer, the term of this patent is extended or adjusted under 35 U.S.C. 154(b) by 199 days.

(21) Appl. No.: 12/284,361

(22) Filed: Sep. 22, 2008

(65) Prior Publication Data
US 2009/0080052 A1    Mar. 26, 2009

(30) Foreign Application Priority Data
Sep. 21, 2007    (CN) .......................... 200710077337

(51) Int. Cl.
*G02B 1/06*    (2006.01)
(52) U.S. Cl. ...................... 359/665; 359/666
(58) Field of Classification Search ................ 359/665, 359/666
See application file for complete search history.

(56) References Cited

U.S. PATENT DOCUMENTS

| 4,818,052 | A  | * | 4/1989  | Le Pesant et al. .............. 385/17 |
| 2002/0196393 | A1 | * | 12/2002 | Tashiro et al. ................ 349/106 |
| 2006/0200106 | A1 |   | 9/2006  | Okubo |
| 2007/0263306 | A1 |   | 11/2007 | Hayes et al. |
| 2008/0278796 | A1 | * | 11/2008 | Roosendaal et al. ......... 359/296 |

* cited by examiner

*Primary Examiner*—Timothy J Thompson
(74) *Attorney, Agent, or Firm*—Wei Te Chung

(57) ABSTRACT

An exemplary electro-wetting display (EWD) device includes a plurality of sub-pixel units. Each sub-pixel unit defines two opposite long sides and two opposite short sides. Each sub-pixel unit includes a first substrate, a second substrate facing toward the first substrate, a conductive first liquid and a polar second sandwiched between the first substrate and the second substrate, and an electrode. The first and second liquids are immiscible. The electrode is disposed at a surface of the second substrate facing the first liquid. The electrode defines an opening. A length of the opening as measured parallel to the nearest short side is not less than 0.8 times a length of the nearest short side.

18 Claims, 3 Drawing Sheets

ELECTRO-WETTING DISPLAY DEVICE

FIELD OF THE INVENTION

The present invention relates to electro-wetting display (EWD) devices.

GENERAL BACKGROUND

Display devices like TFT-LCDs (thin film transistor liquid crystal displays) are used in laptop computers, and are also finding increasingly wider application in GSM (Global System for Mobile communications) telephones. In addition, other kinds of display devices instead of LCDs are being used in GSM telephones; for example, (polymer) LED display devices are being used. Apart from these types of displays, other display techniques, such as EWD devices suitable for flat plate displays are evolving. The electro-wetting functionality provides displays with excellent brightness and contrast, and relatively low power consumption compared to many other display technologies.

Referring to FIG. 5, a top plan diagram of a sub-pixel unit of a related art EWD device is shown. The sub-pixel unit 100 is rectangular, and is defined by two opposite long side walls 101 and two opposite short side walls 102. The long side walls 101 and the short side walls 102 are connected end-to-end, and are made from hydrophobic interfacial materials.

A thin film transistor element 121 is disposed at a corner of the sub-pixel unit 100. Another corner region of the sub-pixel unit 100 adjacent to the thin film transistor element 121 is defined as a first region 129. An area of the first region 129 is substantially two times an area of the thin film transistor element 121. A transparent electrode 122 is disposed in an entire area of the sub-pixel unit 100 except where the thin film transistor element 121 is located. A hydrophobic insulating layer (not shown), an oil layer (not shown), and a water layer (not shown) are positioned in that order on the thin film transistor element 121 and the transparent electrode 122.

An area of the sub-pixel unit 100 is defined as X. The area of the thin film transistor element 121 is defined as Y. The oil layer has more affinity to the long side walls 101 than to the thin film transistor element 121, thus the oil layer in the first region 129 is not apt to move to the thin film transistor element 121. When the sub-pixel unit 100 works in an on state, the oil layer is displaced so that it covers only the first region 129, and therefore the first region 129 is not transparent. Accordingly, an aperture ratio of the sub-pixel unit 100 is substantially (X−3Y)/X. This aperture ratio is rather low.

What is needed, therefore, is to provide an EWD device that can overcome the above-described deficiencies.

SUMMARY

An exemplary electro-wetting display (EWD) device includes a plurality of sub-pixel units. Each sub-pixel unit defines two opposite long sides and two opposite short sides. Each sub-pixel unit includes a first substrate, a second substrate facing toward the first substrate, a conductive first liquid and a polar second liquid sandwiched between the first substrate and the second substrate, and an electrode. The first and second liquids are immiscible. The electrode is disposed at a surface of the second substrate facing toward the first liquid. The electrode defines an opening. A length of the opening as measured parallel to the short side is not less than 0.8 times a length of the nearest short side.

Other novel features and advantages will become more apparent from the following detailed description when taken in conjunction with the accompanying drawings.

DETAILED DESCRIPTION OF EMBODIMENTS

Reference will now be made to the drawings to describe preferred and exemplary embodiments of the present invention in detail.

Figure 1:
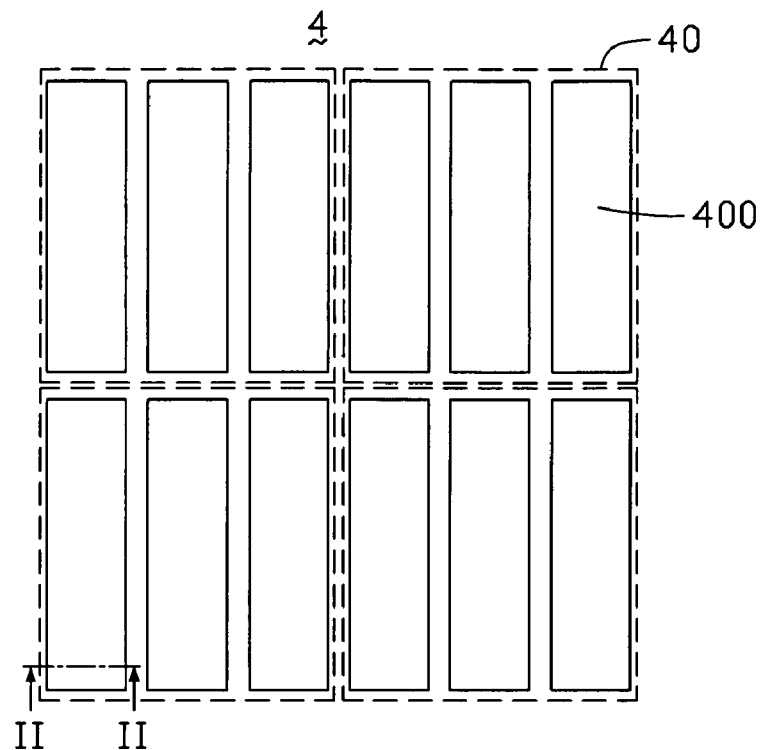
FIG. 1 is a top plan diagram of a part of an EWD device according to an exemplary embodiment of the present invention, the EWD device including a plurality of pixel units, each pixel unit including a plurality of sub-pixel units.

Referring to FIG. 1, an EWD device 4 includes a plurality of pixel units 40 arranged in a matrix. Each pixel unit 40 includes three sub-pixel units 400 corresponding to three primary colors, respectively. Each sub-pixel unit 400 is rectangular.

Figure 2:
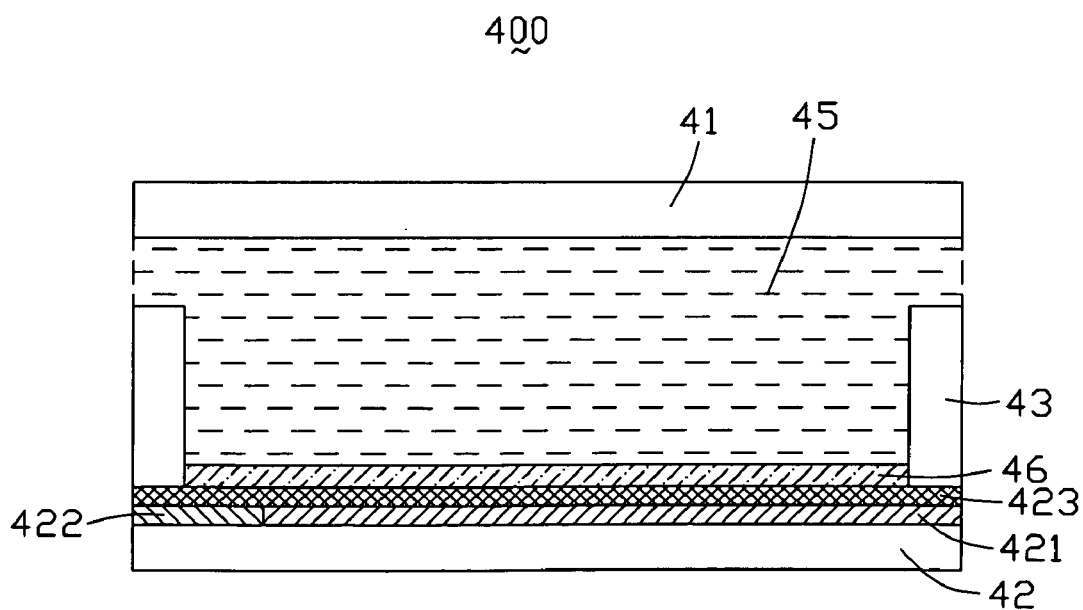
FIG. 2 is side, cross-sectional view of one of the sub-pixel units of the EWD device of FIG. 1, taken along line II-II thereof.

Referring also to FIG. 2, the sub-pixel unit 400 includes an upper substrate 41, a lower substrate 42 facing toward the upper substrate 41, and four side walls 43 sandwiched between the upper substrate 41 and the lower substrate 42. The side walls 43 are connected end-to-end. The side walls 43, the upper substrate 41, and the lower substrate 43 cooperatively form an accommodating space (not labeled). The upper substrate 41 is made from transparent material.

The accommodating space is filled with a first liquid 45 and a second liquid 46. The first liquid 45 and the second liquid 46 are immiscible. The first liquid 45 can be made from conductive material such as water or salt solutions. The second liquid 46 can be made from polar material such as alkane, or oil. The second liquid 46 functions as a masking liquid.

The sub-pixel unit 400 further includes a transparent electrode 421, a driving element 422, and an insulating layer 423. The electrode 421 and the driving element 422 are disposed on the lower substrate 42. The insulating layer 423 is disposed on the electrode 421 and the driving element 422. The insulating layer 423 can be made from hydrophobic material, such as amorphous fluoropolymer. The driving element 422 can be a thin film transistor.

Figure 3:
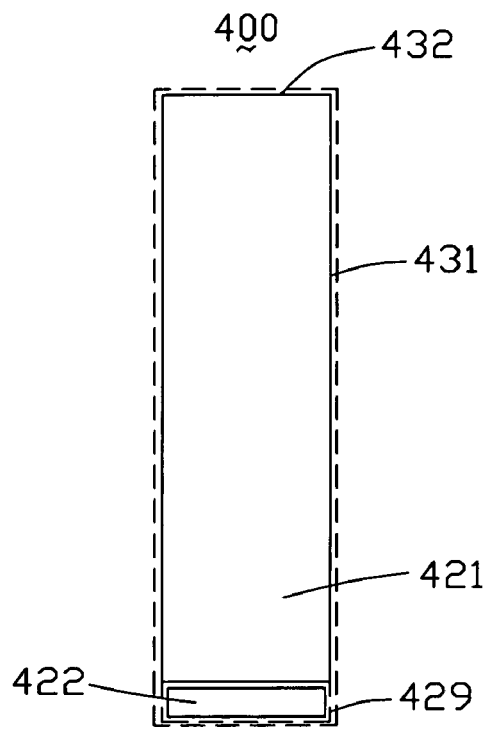
FIG. 3 is a top plan diagram of the sub-pixel unit of FIG. 2.

Referring also to FIG. 3, the side walls 43 include two opposite long side walls 431 and two opposite short side walls 432. The electrode 421 defines a rectangular opening 429 alongside one of the short side walls 432. A length of the opening 429 as measured parallel to the short side wall 432 is the same as a length of the short side wall 432. The electrode 421 is rectangular. A length of a short side (not labeled) of the electrode 421 is the same as the length of the short side wall 431. A length of a long side (not labeled) of the electrode 421 is shorter than a length of each of the long side walls 431. The driving element 422 is opaque, and substantially fills the opening 429. An area of the opening 429 is defined as Y, and an area of the sub-pixel unit 400 is defined as X.

When there is no voltage difference between the first liquid 45 and the electrode 421, the second liquid 46 covers the insulating layer 423 completely because of interfacial tension among the insulating layer 423, the first liquid 45, and the second liquid 46. The second liquid 46 absorbs incident light, and therefore the sub-pixel 400 works in an off state.

When a voltage difference is applied between the first liquid 45 and the electrode 421, electrons disturb the interfacial tension. The first liquid 45 pushes the second liquid 46 to a region corresponding to the opening 429. Incident light transmits through the electrode 421. Therefore, the sub-pixel unit 400 works in an on state. An aperture ratio of the sub-pixel unit 400 is substantially (X−Y)/X.

Unlike with conventional EWD devices, the length projection of the opening 429 as measured parallel to the short side wall 432 is the same as the length of the short side wall 432, such that the second liquid 46 can be completely confined into the region corresponding to the opening 429. Thus, the aperture ratio of the EWD device 4 is improved.

Figure 4:
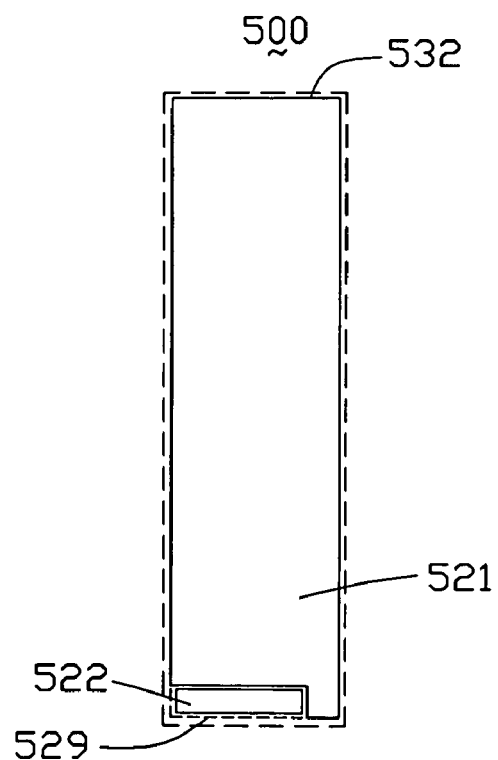
FIG. 4 is a top plan diagram of a sub-pixel unit of an EWD device according to a second embodiment of the present invention.
Figure 5:
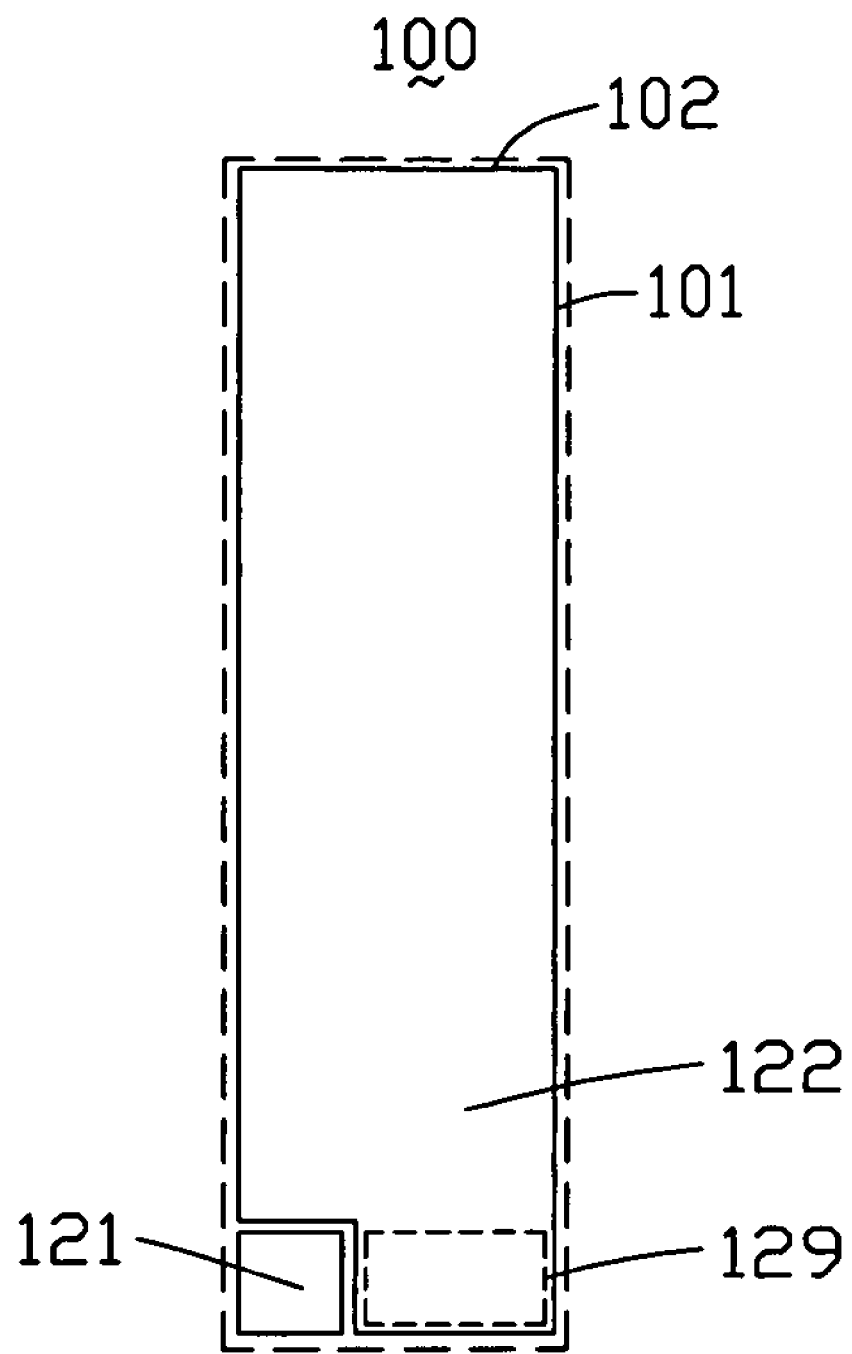
FIG. 5 is a top plan diagram of a sub-pixel unit of a related art EWD device.

Referring to FIG. 4, a top plan diagram of a sub-pixel unit 500 of an EWD device (not labeled) according to a second embodiment of the present invention is shown. In the EWD device, an electrode 521 defines an opening 529 adjacent to a corner of the sub-pixel unit 500. An opaque driving element 522 substantially fills the opening 529. A length of the opening 529 as measured parallel to a short side wall 532 is less than the length of the short side wall 532. Typically, such length of the opening 529 is not less than 0.8 times the length of the short side wall 532.

It is to be further understood that even though numerous characteristics and advantages of preferred and exemplary embodiments have been set out in the foregoing description, together with details of structures and functions associated with the embodiments, the disclosure is illustrative only, and changes may be made in detail (including in matters of shape, size, and arrangement of parts) within the principles of the invention to the full extent indicated by the broad general meaning of the terms in which the appended claims are expressed.

What is claimed is:

1. An electro-wetting display (EWD) device comprising:
a plurality of sub-pixel units, each sub-pixel unit defining two opposite long sides and two opposite short sides, each sub-pixel unit comprising:
a first substrate;
a second substrate facing toward the first substrate;
a conductive first liquid sandwiched between the first substrate and the second substrate;
a polar second liquid sandwiched between the first substrate and the second substrate, the first and second liquids being immiscible; and
an electrode disposed at a surface of the second substrate facing toward the first liquid, the electrode comprising an opening for receiving a driving element, wherein a length of the opening as measured parallel to the nearest short side is not less than 0.8 times a length of the nearest short side.

2. The EWD device of claim 1, wherein the length of the opening is one of equal to and slightly less than the length of the nearest short side.

3. The EWD device of claim 1, wherein the length of the opening is substantially equal to the length of the nearest short side.

4. The EWD device of claim 1, wherein the opening is rectangular.

5. The EWD device of claim 1, wherein the opening is adjacent to both the nearest short side and at least one of the long sides.

6. The EWD device of claim 1, wherein the opening is adjacent to the nearest short side.

7. The EWD device of claim 1, wherein the driving element substantially fills the entire opening.

8. An electro-wetting display (EWD) device comprising:
a plurality of sub-pixel units, each sub-pixel unit comprising:
a first substrate;
a second substrate facing toward the first substrate;
a conductive first liquid sandwiched between the first substrate and the second substrate;
a polar second liquid sandwiched between the first substrate and the second substrate, the first and second liquids being immiscible;
an electrode disposed at a surface of the second substrate facing toward the first liquid, the electrode comprising an opening; and
a driving element disposed in the opening, wherein when the sub-pixel unit is in an on state, at least some of the second liquid is displaced to an area of the sub-pixel unit corresponding to the location of the driving element.

9. The EWD device of claim 8, wherein the driving element substantially fills the entire opening.

10. The EWD device of claim 8, wherein the area of the sub-pixel unit to which said at least some of the second liquid is displaced is substantially directly above the driving element.

11. The EWD device of claim 8, wherein each sub-pixel unit defines two opposite long sides and two opposite short sides, and the opening is adjacent to the nearest short side of the sub-pixel unit.

12. The EWD device of claim 11, wherein the opening is also adjacent to at least one of the long sides of the sub-pixel unit.

13. The EWD device of claim 11, wherein a length of the opening as measured parallel to the nearest short side is not less than 0.8 times a length of the nearest short side.

14. The EWD device of claim 11, wherein a length of the opening as measured parallel to the nearest short side is one of equal to and slightly less than a length of the nearest short side.

15. The EWD device of claim 11, wherein a length of the opening as measured parallel to the nearest short side is substantially equal to a length of the nearest short side.

16. The EWD device of claim 9, wherein the opening is rectangular.

17. The EWD device of claim 16, wherein the driving element is rectangular.

18. The EWD device of claim 8, wherein the driving element is a thin film transistor.

* * * * *

UNITED STATES PATENT AND TRADEMARK OFFICE
CERTIFICATE OF CORRECTION

| | | |
|---|---|---|
| PATENT NO. | : 7,876,506 B2 | Page 1 of 1 |
| APPLICATION NO. | : 12/284361 | |
| DATED | : January 25, 2011 | |
| INVENTOR(S) | : Sung-Yen Chen and Shuo-Ting Yan | |

It is certified that error appears in the above-identified patent and that said Letters Patent is hereby corrected as shown below:

Title Page;
Please replace Section (73) regarding "Assignees" on the front page of the Patent with the following:

(73) Assignees: Chimei Innolux Corporation, Miao-Li County (TW).

Signed and Sealed this
Seventh Day of June, 2011

David J. Kappos
*Director of the United States Patent and Trademark Office*